US007014983B1

(12) United States Patent
Patel et al.

(10) Patent No.: US 7,014,983 B1
(45) Date of Patent: Mar. 21, 2006

(54) MULTILAYER IMAGEABLE ELEMENT

(75) Inventors: Jayanti Patel, Fort Collins, CO (US); Ting Tao, Fort Collins, CO (US); Scott Beckley, Windsor, CO (US); John Kalamen, Loveland, CO (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/958,957

(22) Filed: Oct. 5, 2004

(51) Int. Cl.
*G03F 7/039* (2006.01)
*G03F 7/11* (2006.01)
*G03F 7/30* (2006.01)

(52) U.S. Cl. .................. 430/271.1; 430/302; 430/330; 430/905; 430/907; 430/910; 430/964

(58) Field of Classification Search ............ 430/271.1, 430/302, 330, 964, 905, 907, 910
See application file for complete search history.

(56) References Cited

U.S. PATENT DOCUMENTS

| 6,004,728 | A | 12/1999 | Deroover et al. |
| 6,040,113 | A | 3/2000 | Van Damme et al. |
| 6,152,036 | A | 11/2000 | Verschueren et al. |
| 6,165,689 | A | 12/2000 | Vermeersch et al. |
| 6,192,799 | B1 | 2/2001 | Damme et al. |
| 6,235,451 | B1 | 5/2001 | Damme et al. |
| 6,294,311 | B1 | 9/2001 | Shimazu et al. |
| 6,342,336 | B1 | 1/2002 | Verschueren et al. |
| 6,352,811 | B1 | 3/2002 | Patel et al. |
| 6,352,812 | B1 | 3/2002 | Shimazu et al. |
| 6,358,669 | B1 | 3/2002 | Savariar-Hauck et al. |
| 6,451,505 | B1 | 9/2002 | Patel et al. |
| 6,472,119 | B1 | 10/2002 | Verschueren et al. |
| 6,534,238 | B1 | 3/2003 | Savariar-Hauck et al. |
| 6,593,055 | B1 | 7/2003 | Shimazu et al. |
| 6,645,689 | B1 | 11/2003 | Jarek |
| 6,723,490 | B1 | 4/2004 | Patel et al. |
| 6,830,862 | B1 | 12/2004 | Kitson et al. |

FOREIGN PATENT DOCUMENTS

| JP | 2001-042509 | 2/2001 |
| JP | 2001-042510 | 2/2001 |

*Primary Examiner*—Richard L. Schilling

(57) ABSTRACT

Multilayer, thermally imageable elements useful as lithographic printing plate precursors are disclosed. The imageable elements comprise a substrate, an underlayer over the substrate, an underlayer over the substrate, and a top layer over the underlayer. The top layer contains a co-polymer that alkylene glycol side chains, polyalkylene glycol side chains, side chains that have silyl groups substituted with three alkoxy and/or phenoxy groups, and/or side chains that have alkyl ammonium side chains. The imageable elements have excellent resistance to press room chemicals.

20 Claims, No Drawings

MULTILAYER IMAGEABLE ELEMENT

FIELD OF THE INVENTION

The invention relates to lithographic printing. In particular, this invention relates to multilayer imageable elements useful as lithographic printing plate precursors that have good solvent resistance.

BACKGROUND OF THE INVENTION

In conventional or "wet" lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically, the ink is first transferred to an intermediate blanket, which in turn transfers the ink to the surface of the material upon which the image is to be reproduced.

Imageable elements useful as lithographic printing plate precursors typically comprise an imageable layer applied over the hydrophilic surface of a substrate. The imageable layer includes one or more radiation-sensitive components, which may be dispersed in a suitable binder. Alternatively, the radiation-sensitive component can also be the binder material. Following imaging, either the imaged regions or the unimaged regions of the imageable layer are removed by a suitable developer, revealing the underlying hydrophilic surface of the substrate. If the imaged regions are removed, the precursor is positive working. Conversely, if the unimaged regions are removed, the precursor is negative working. In each instance, the regions of the imageable layer (i.e., the image areas) that remain are ink-receptive, and the regions of the hydrophilic surface revealed by the developing process accept water and aqueous solutions, typically a fountain solution, and repel ink.

Conventional imaging of the imageable element with ultraviolet and/or visible radiation was carried out through a mask, which has clear and opaque regions. Imaging takes place in the regions under the clear regions of the mask but does not occur in the regions under the opaque regions. However, direct digital imaging, which obviates the need for imaging through a mask, is becoming increasingly important in the printing industry. Imageable elements for the preparation of lithographic printing plates have been developed for use with infrared lasers. Thermally imageable, multilayer elements are disclosed, for example, in Shimazu, U.S. Pat. No. 6,294,311, U.S. Pat. No. 6,352,812, and U.S. Pat. No. 6,593,055; Patel, U.S. Pat. No. 6,352,811; Savariar-Hauck, U.S. Pat. No. 6,358,669, and U.S. Pat. No. 6,528,228; and Kitson, 2004/0067432 A1; the disclosures of which are all incorporated herein by reference.

In use, a lithographic printing plate comes in contact with fountain solution. In addition, the printing plate is often subjected to aggressive blanket washes, such as a "UV wash" to remove ultraviolet curable inks. However, many of these systems have limited resistance to either fountain solution and/or aggressive blanket washes. Thus, a need exists for positive working, multi-layer, thermally imageable elements, useful as lithographic printing plate precursors, that have resistance to these solvents.

SUMMARY OF THE INVENTION

In one aspect, the invention is an imageable element that has excellent chemical resistance. The imageable element comprises:
  a substrate;
  an underlayer over the substrate; and
  a top layer over the underlayer;
in which:
  the element comprises a photothermal conversion material;
  the top layer is substantially free of the photothermal conversion material;
  the top layer is ink receptive;
  before thermal imaging, the top layer is not removable by an alkaline developer;
  after thermal imaging to form imaged regions in the top layer, the imaged regions are removable by the alkaline developer;
  the underlayer is removable by the alkaline developer, and the top layer comprises a co-polymer that comprises K units, L units, and M units; in which:
  the K units are selected from the group consisting of $-[CH_2C(R^1)R^2]-$, $-[CH_2CR^3(CO_2R^4)]-$, $-[CH_2CR^5(CON(R^6)(R^7))]-$, $-[C(R^8)(COECO)C(R^9)]-$, and mixtures thereof;
  the L units are selected from the group consisting of $-[CH_2CH(CN)]-$, $-[CH_2C(CH_3)(CN)]-$, and mixtures thereof;
  the M units are selected from the group consisting of $-[CH_2C(R^{10})(WSi(OR^{11})_3)]-$, $-[CH_2C(R^{12})(CO_2(B)_{n_1}T)]-$, $-[(CH_2C(R^{13})(CO_2(CH_2)_{n_2}N^+(R^{14})_3)X^-)]-$, and mixtures thereof
  $R^1$, $R^3$, $R^5$, $R^8$, $R^9$, $R^{10}$, $R^{12}$, and $R^{13}$ are each independently hydrogen, methyl, or a mixture thereof;
  $R^2$ is hydrogen, methyl, phenyl, substituted phenyl, halogen, alkoxy of one to four carbon atoms, acyl of one to five carbon atoms, acyloxy of one to five carbon atoms, vinyl, allyl, or a mixture thereof;
  $R^4$, $R^6$, and $R^7$ are each independently hydrogen, alkyl of one to six carbon atoms, or a mixture thereof;
  each $R^{11}$ is independently phenyl, alkyl of one to eight carbon atoms, or a mixture thereof;
  each $R^{14}$ is independently hydrogen, alkyl of one to six carbon atoms, or a mixture thereof;
  E is oxygen or $NR^{15}$ in which $R^{15}$ is hydrogen, hydroxyl, phenyl, substituted phenyl, alkyl of one to six carbon atoms, benzyl, or a mixture thereof;
  W is a bivalent linking group, a combination of bivalent linking groups, or a mixture of bivalent linking groups;
  B is selected from the group consisting of $-[CH_2CH(R^{16})O]-$, $-[CH_2C(R^{17})(OH)]-$, and mixtures thereof, in which each $R^{16}$ and $R^{17}$ is independently hydrogen, alkyl of one to six carbon atoms, or a mixture thereof;
  T is hydrogen, alkyl of one to eight carbon atoms, phenyl, or a mixture thereof;
  $X^-$ is an anion;
  $n_1$ is 1 to 100; and
  $n_2$ is 2 to 8.

In another aspect, the invention is a method for forming an image by imaging and developing the imageable element. In another aspect, the invention is an image formed by imaging and developing the imageable element. In yet another aspect, the invention is the co-polymer made up of K units, L units, and M units.

DETAILED DESCRIPTION OF THE INVENTION

Unless the context indicates otherwise, in the specification and claims, the terms polymeric material, co-polymer, added polymer, K units, L units, M units, photothermal conversion material, surfactant, and similar terms also include mixtures of such materials. Unless otherwise specified, all percentages are percentages by weight and all temperatures are in degrees Centigrade (degrees Celsius). Thermal imaging refers to imaging with a hot body, such as a thermal head, or with infrared radiation.

Imageable Element

The invention is an imageable element comprising a support, a top layer, and an underlayer. The element also comprises a photothermal conversion material. The top layer is ink receptive and substantially free of the photothermal conversion material. Before thermal imaging, the top layer is not removable by an alkaline developer, but after thermal imaging the imaged regions of the top layer are removable by the developer. The underlayer is removable by the developer.

Top Layer

Co-Polymers

The top layer comprises a co-polymer that comprises K units, L units, and M units. The K units typically comprise about 1 wt % to about 78 wt %, preferably about 10 wt % to about 60 wt % of the co-polymer. The L units comprise cyano groups and typically comprise about 20 wt % to about 98 wt %, preferably about 40 wt % to about 90 wt %, of the co-polymer. The M units comprise alkylene glycol side chains, polyalkylene glycol side chains, side chains that have silyl groups substituted with three alkoxy and/or phenoxy groups, and/or side chains that have trialkyl ammonium side chains, and typically comprise about 1 wt % to about 30 wt %, preferably about 5 wt % to about 20 wt %, of the co-polymer. Small amounts of other units may be present, but are not required. The sum of the wt % of the K units, the wt % of the L units, and the wt % of the M units is typically about 100%, such that the co-polymer consists essentially of, or consists of, the K units, L units, and the M units.

The K units are selected from the group consisting of —[$CH_2C(R^1)R^2$]—, —[$CH_2CR^3(CO_2R^4)$]—, —[$CH_2CR^5(CON(R^6)(R^7))$]—, —[$C(R^8)(COECO)C(R^9)$]—, and mixtures thereof. The K units are typically —[$CH_2C(R^1)R^2$]—, —[$CH_2CR^5(CON(R^6)(R^7))$]—, —[$CH_2CR^3(CO_2R^4)$]—, or a mixture thereof. The L units are selected from the group consisting of —[$CH_2CH(CN)$]—, —[$CH_2C(CH_3)(CN)$]—, and mixtures thereof. The M units are selected from the group consisting of —[$CH_2C(R10)(WSi(OR^{11})_3)$]—, —[$CH_2C(R^{12})(CO_2(B)_{n1}T)$]—, —[$(CH_2C(R^{13})(CO_2(CH_2)_{n2}N^+(R^{14})_3)X^-)$]—, and mixtures thereof.

$R^1$, $R^3$, $R^5$, $R^8$, $R^9$, $R^{10}$, $R^{12}$, and $R^{13}$ are each independently hydrogen, methyl, or a mixture thereof.

$R^2$ is hydrogen, methyl, phenyl, substituted phenyl, halogen, alkoxy of one to four carbon atoms, acyl of one to five carbon atoms, acyloxy of one to five carbon atoms, vinyl, allyl, or a mixture thereof. Substituted phenyl groups include, for example, 4-methylphenyl, 3-methylphenyl, 4-methoxyphenyl, 4-cyanophenyl, 4-chlorophenyl, 4-fluorophenyl, 4-acetoxyphenyl, 3,5-dichlorophenyl, and 2,4,6-trimethylphenyl. Halogen includes fluoro (F), chloro (Cl), and bromo (Br). Alkoxy groups of one to four carbon atoms include, for example, methoxy, ethoxy, n-propoxy, iso-propoxy, n-butoxy, and t-butoxy. Acyl of one to five carbon atoms include, for example, $H_3CO$— (acetyl), $CH_3CH_2CO$—, $CH_3(CH_2)_2CO$—, $CH_3(CH_2)_3CO$—, and $(CH_3)_3CCO$—. Acyloxy of one to five carbon atoms include, for example, $H_3CC(O)O$— (acetyloxy), $CH_3CH_2C(O)O$—, $CH_3(CH_2)_2C(O)O$—, $CH_3(CH_2)_3C(O)O$—, and $(CH_3)_3CC(O)O$—. $R^2$ is preferably phenyl.

$R^4$, $R^6$, and $R^7$ are each independently hydrogen, alkyl of one to six carbon atoms, phenyl, or a mixture thereof. Alkyl groups of one to six carbon atoms, include, for example, methyl, ethyl, n-propyl, iso-propyl, n-butyl, sec-butyl, iso-butyl, t-butyl, n-pentyl, iso-pentyl, neo-pentyl, n-hexyl, iso-hexyl, 1,1-dimethyl-butyl, 2,2-dimethyl-butyl, and cycloalkyl groups such as, cyclopropyl, cyclobutyl, cyclopentyl, methylcyclopentyl, and cyclohexyl. $R^4$, $R^6$, and $R^7$ are each typically hydrogen, methyl, or a mixture thereof.

Each $R^{11}$ is independently phenyl, alkyl of one to eight carbon atoms, or a mixture thereof. Alkyl groups of one to eight carbon atoms include, for example, the alkyl groups of one to six carbon atoms listed above, n-heptyl, n-octyl, 2-ethylhexyl, and 2,2,4-trimethylpentyl, and cycloalkyl groups such as cycloheptyl, 4-methylcyclohexyl, cyclooctyl, 1-methylcycloheptyl, 2,6-dimethylcyclohexyl, 4-methylcyclohexyl, and 4-ethylcyclohexyl. $R^{11}$ is typically methyl.

—[$C(R^8)(COECO)C(R^9)$]— represents a cyclic anhydride or cyclic imide structure, such as is produced on free radical polymerization of maleic anhydride or N-phenyl maleimide. That is, the first and last carbon atoms are bonded by a carbon—carbon single bond. E is oxygen or $NR^{15}$ in which $R^{15}$ is hydrogen, hydroxyl, phenyl, substituted phenyl, alkyl of one to six carbon atoms, benzyl, or a mixture thereof. Examples of substituted phenyl groups and alkyl groups of one to six carbon atoms are listed above.

Each $R^{14}$ is independently hydrogen, alkyl of one to six carbon atoms, such as are listed above, or a mixture thereof. $R^{14}$ is typically methyl.

W is a bivalent linking group, a combination of bivalent linking groups, or a mixture of bivalent linking groups. Bivalent linking groups include, for example, the carbon-silicon single bond (i.e., the M unit has the structure: —[$CH_2C(R^{10})Si(OR^{11})_3$]—); oxygen (—O—); carbonyl (—C(O)—); carboxy (—$CO_2$—); alkylene groups (—($CH_2$)$_m$—) containing 1 to 8 carbon atoms (m is 1 to 8); and phenylene (—($C_6H_4$)—) groups, such as the o-, m-, and p-phenylene groups. Combinations of these groups may also be used. Preferred bivalent linking groups include the carbon-silicon single bond, the phenylene group, alkylene groups containing 2 to 6 carbon atoms (i.e., the M unit has the structure —[$CH_2C(R^{10})(CH_2)_mSi(OR^{11})_3$]—, in which m is 2 to 6); and carboxy alkyl groups (combinations of the carboxy group and alkylene groups) of the formula —$CO_2$($CH_2$)$_m$—, in which m is 2 to 6 (i.e., the M unit has the structure —[$CH_2C(R^{1'})CO_2(CH_2)_mSi(OR^{1'})_3$]—).

B is selected from the group consisting of —[$CH_2CH(R^{16})O$]—, —[$CH_2C(R^{17})(OH)$]—, and mixtures thereof, in which each $R^{16}$ and $R^{17}$ is independently hydrogen, alkyl of one to six carbon atoms, such as is listed above, or a mixture thereof. $R^{16}$ and $R^{17}$ are each typically hydrogen or methyl, more typically hydrogen. B is typically —[$CH_2CH(R^{16})O$]—, more typically —[$CH_2CH_2O$]—.

T is hydrogen, alkyl of one to eight carbon atoms, such as are listed above, phenyl, or a mixture thereof. Examples of alkyl groups of one to eight carbon atoms are listed above.

X⁻ is an anion. Typical anions include, for example, halides such as chloride and bromide; acetate, nitrate; borates such as tetrafluoroborate and tetraphenylborate; sulfates such as methyl sulfate, ethyl sulfate, and trifluoromethyl sulfate; hexafluorophosphate; and sulfonates, such as fluoromethyl sulfonate, pentafluoroethyl sulfonate, and methyl sulfonate. Polyvalent anions, such as sulfate, may also be used.

$n_1$ is 1 to 100, typically 10 to 50. $n_2$ is 2 to 8.

Preparation of the Co-Polymers

The co-polymers may be prepared by free radical polymerization. In a typical preparation, a mixture of three monomers, one that is the precursor of the K unit, one that is the precursor of the L unit, and one that is the precursor of the M unit are co-polymerized. Free radical polymerization is well known to those skilled in the art and is described, for example, in Chapters 20 and 21, of *Macromolecules*, Vol. 2, 2nd Ed., H. G. Elias, Plenum, N.Y., 1984. Useful free radical initiators are peroxides such as benzoyl peroxide, hydroperoxides such as cumyl hydroperoxide and azo compounds such as 2,2'-azobis(isobutyronitrile) (AIBN). Chain transfer agents, such as dodecyl mercaptan, may be used to control the molecular weight of the compound. Suitable solvents for free radical polymerization include liquids that are inert to the reactants and which will not otherwise adversely affect the reaction, for example, water; esters such as ethyl acetate and butyl acetate; ketones such as methyl ethyl ketone, methyl isobutyl ketone, methyl propyl ketone, and acetone; alcohols such as methanol, ethanol, iso-propyl alcohol, n-propanol, 1-methoxyethanol (Methyl CELLOSOLVE®), n-butanol; ethers such as dioxane and tetrahydrofuran; amides, such as, N,N-dimethylformamide and N,N-dimethylacetamide, and mixtures thereof.

Precursors of the K unit include, for example, styrene; substituted styrenes, such as 3-methyl styrene, 4-methyl styrene, 4-methoxy styrene, 4-acetoxy styrene, and alpha-methyl styrene; acrylate and methacrylate esters, such as methyl acrylate, ethyl acrylate, butyl acrylate, n-hexyl acrylate, methyl methacrylate, ethyl methacrylate, n-propyl methacrylate, n-butyl methacrylate, n-pentyl methacrylate, neo-pentyl methacrylate, cyclohexyl methacrylate, n-hexyl methacrylate, 2-ethoxyethyl methacrylate, and allyl methacrylate; vinyl esters, such as vinyl acetate and vinyl butyrate; vinyl ketones, such as methyl vinyl ketone and butyl vinyl ketone; vinyl chloride; vinyl bromide; maleimides, such as maleimide, N-phenyl maleimide, N-cyclohexyl maleimide, N-benzyl maleimide, and N-hydroxy maleimide; acrylamides; such as acrylamide, methacrylamide, N,N-dimethyl acrylamide, and N,N-dimethyl methacrylamide; and mixtures thereof. Preferred precursors for the K unit include styrene, methyl methacrylate, N-phenyl maleimide, and methacrylamide. If a mixture of, for example, styrene, ethyl acrylate, methyl methacrylate is used as the precursor for the K units, in the resulting co-polymer the K units are a mixture of —[CH$_2$C(R$^1$)R$^2$]— units and —[CH$_2$CR$^3$(CO$_2$R$^4$)]— units, in which R$^1$ is hydrogen, R$^2$ is phenyl, R$^3$ is a mixture of hydrogen and methyl, and R$^4$ is a mixture of methyl and ethyl.

Precursors for the L unit are acrylonitrile, methacrylonitrile, and mixtures thereof.

Precursors for the M unit include, for example:
vinyl trimethoxysilane, vinyl triethoxysilane, vinyl tributoxysilane, allyl trimethoxysilane, allyl triethoxysilane, 4-(trimethoxysilyl)-1-butene, 2-(trimethoxysilyl)ethyl acrylate, 2-(trimethoxysilyl)ethyl methacrylate, 3-(trimethoxysilyl)propyl acrylate, 3-(trimethoxysilyl)propyl methacrylate, 3-(triethoxysilyl)propyl acrylate, 3-(trimethoxysilyl)propyl methacrylate, 3-(tripropoxysilyl)propyl acrylate, 3-(tripropoxysilyl)propyl methacrylate, 3-(tributoxysilyl)propyl acrylate, 3-(tributoxysilyl)propyl methacrylate, 4-(trimethoxysilyl)butyl acrylate, 4-(trimethoxysilyl) butyl methacrylate, 5-(trimethoxysilyl)pentyl acrylate, 5-(trimethoxysilyl) pentyl methacrylate, 6-(trimethoxysilyl)hexyl acrylate, 6-(trimethoxysilyl) hexyl methacrylate, ethylene glycol monoacrylate (2-hydroxyethyl acrylate), ethylene glycol monomethacrylate (2-hydroxyethyl methacrylate), polyethylene glycol monomethacrylate, polypropylene glycol methyl ether methacrylate, polyethylene glycol ethyl ether methacrylate, polyethylene glycol butyl ether methacrylate, polypropylene glycol hexyl ether methacrylate, polypropylene glycol octyl ether methacrylate, polyethylene glycol methyl ether acrylate, polyethylene glycol ethyl ether acrylate, polyethylene glycol phenyl ether acrylate, polypropylene glycol monoacrylate, polypropylene glycol monomethacrylate, polypropylene glycol methyl ether methacrylate, polypropylene glycol ethyl ether methacrylate, polypropylene glycol butyl ether methacrylate, poly(ethylene glycol/propylene glycol) methyl ether methacrylate, poly(vinyl alcohol) monomethacrylate, poly(vinyl alcohol) monoacrylate, 2-[(acryloyloxy)ethyl]-trimethylammonium chloride, 2-[(acryloyloxy)ethyl]-trimethylammonium methyl sulfate, 2-[(acryloyloxy)ethyl]-trimethylammonium chloride, 2-[(methacryloyloxy)ethyl]-trimethylammonium chloride, 3-[(methacryloyloxy)propyl]-trimethylammonium chloride, 3-[(acryloyloxy)propyl]-trimethylammonium chloride, 4-[(methacryloyloxy)butyl]-trimethylammonium chloride, 4-[(acryloyloxy)butyl]-trimethylammonium chloride, 5-[(methacryloyloxy)pentyl]-trimethylammonium chloride, 5-[(acryloyloxy)pentyl]-trimethylammonium chloride;

and mixtures thereof.

Preferred precursors for the M unit include: vinyl trimethoxysilane, monomers of the structure: CH$_2$=C(R$^{10}$)(CO$_2$(CH$_2$)$_m$Si(OCH$_3$)$_3$), in which R$^{10}$ is hydrogen or methyl and m is 2 to 6, such as 2-(trimethoxysilyl)ethyl acrylate, 2-(trimethoxysilyl)ethyl methacrylate, 3-(trimethoxysilyl)propyl acrylate, 3-(trimethoxysilyl)propyl methacrylate, 4-(trimethoxysilyl)butyl acrylate, 4-(trimethoxysilyl)butyl methacrylate, 5-(trimethoxysilyl)pentyl acrylate, 5-(trimethoxysilyl)pentyl methacrylate, 6-(trimethoxysilyl)hexyl acrylate, and 6-(trimethoxysilyl)hexyl methacrylate; poly(ethylene glycol) methyl ether methacrylate, poly(ethylene glycol) acrylate, and poly(propylene glycol) methyl ether methacrylate; 2-[(methacryloyloxy)ethyl] trimethylammonium chloride, and 3-[(methacryloyloxy)propyl]trimethylammonium chloride; and mixtures thereof. Commercially available precursors for the M unit include, for example, 2-hydroxyethyl methacrylate (CAS# 868-77-9), poly(ethylene glycol) acrylate (CAS# 9051-31-4), poly(ethylene glycol)methyl ether methacrylate (CAS# 26915-72-0), vinyl trimethoxysilane (CAS# 754-05-2), 3-(trimethoxysilyl)propyl methacrylate (CAS# 2530-85-0); and 2-[(methacryloyloxy)ethyl]trimethylammonium chloride (CAS# 5039-78-1).

Although preparation of the co-polymers has been described in terms of monomers that can be used to form the co-polymers, this does not limit the copolymers to those formed by polymerization of the indicated monomers. The copolymers may be formed by other routes that will be apparent to those skilled in the art, such as by modification of precursor polymers. For example, the co-polymer may be formed by addition of a —Si(OR$^{11}$)$_3$ group, or a —WSi (OR$_{11}$)$_3$ group, to an appropriate precursor polymer.

Added Polymer

One or more other added polymers may also be present in the top layer. When present, the added polymer comprises about 0.1 wt % to about 50 wt %, preferably about 1 wt % to about 20 wt % of the top layer. The added polymer is typically a phenolic resin, such as a novolac resin, a resole resin, or a polyvinyl phenol. When present the preferred added polymers are novolac resins.

Novolac resins are commercially available and are well known to those skilled in the art. They are typically prepared by the condensation reaction of a phenol, such as phenol, m-cresol, o-cresol, p-cresol, etc, with an aldehyde, such as formaldehyde, paraformaldehyde, acetaldehyde, etc. or ketone, such as acetone, in the presence of an acid catalyst. The weight average molecular weight is typically about 1,000 to 15,000. Typical novolac resins include, for example, phenol-formaldehyde resins, cresol-formaldehyde resins, phenol-cresol-formaldehyde resins, p-t-butylphenol-formaldehyde resins, and pyrogallol-acetone resins. Solvent soluble novolac resins having a weight average molecular weight of at least 10,000; solvent soluble m-cresol/p-cresol novolac resins that comprises at least 10 mol % p-cresol and have a weight average molecular weight of at least 8,000; and mixtures thereof may be particularly useful.

The top layer may also comprise other ingredients such as dyes and surfactants that are conventional ingredients of imageable elements. A surfactant, such as a fluorinated surfactant or a polyethoxylated dimethylpolysiloxane co-polymer, or a mixture of surfactants may be present to help disperse the other ingredients in a coating solvent and/or to act as a coating aid. A dye may be present to aid in the visual inspection of the imaged and/or developed element. Printout dyes distinguish the imaged regions from the unimaged regions during processing. Contrast dyes distinguish the unimaged regions from the imaged regions in the developed imageable element i.e., the resulting lithographic printing plate.

Underlayer

The underlayer is between the top layer and the substrate. It is over the substrate and, typically, on the substrate. The underlayer comprises a polymeric material that is removable by the developer, and preferably soluble in the developer. In addition, the polymeric material is preferably insoluble in the solvent used to coat the top layer so that the top layer can be coated over the underlayer without dissolving the underlayer. Other ingredients, additional polymers, photothermal conversion materials, and surfactants, may also be present in the underlayer. Useful polymeric materials include carboxy functional acrylics, vinyl acetate/crotonate/vinyl neodecanoate co-polymers, styrene maleic anhydride copolymers, phenolic resins, maleated wood rosin, and combinations thereof. Underlayers that provide resistance both to fountain solution and aggressive washes are disclosed in Shimazu, U.S. Pat. No. 6,294,311, incorporated herein by reference.

Particularly useful polymeric materials are polyvinylacetals and co-polymers that comprise N-substituted maleimides, especially N-phenylmaleimide; methacrylamides, especially methacrylamide; and acrylic and/or methacrylic acid, especially methacrylic acid. The preferred polymeric materials of this type are co-polymers of N-phenylmaleimide, methacrylamide, and methacrylic acid, more preferably those that contain about 25 to about 75 mol %, preferably about 35 to about 60 mol % of N-phenylmaleimide; about 10 to about 50 mol %, preferably about 15 to about 40 mol % of methacrylamide; and about 5 to about 30 mol %, preferably about 10 to about 30 mol %, of methacrylic acid. Other hydrophilic monomers, such as hydroxyethyl methacrylate, may be used in place of some or all of the methacrylamide. Other alkaline soluble monomers, such as acrylic acid, may be used in place of some or all of the methacrylic acid. These polymeric materials are soluble in a methyl lactate/methanol/dioxolane (15:42.5:42.5 wt %) mixture, which can be used as the coating solvent for the underlayer. However, they are poorly soluble in solvents such as acetone and toluene, which can be used as solvents to coat the top layer over the underlayer without dissolving the underlayer. The bakable underlayers disclosed in U.S. patent application Ser. No. 10/641,888, filed Aug. 14, 2003; U.S. patent application Ser. No. 10/820,546, filed Apr. 8, 2004; and U.S. patent application Ser. No. 10/681,701, filed Oct. 8, 2003; the disclosures of which are all incorporated herein by reference, may also be used.

The underlayer may also comprise one or more other polymeric materials, provided addition of these polymeric materials does not adversely affect the chemical resistance and solubility properties of the underlayer. Preferred other polymeric materials, when present, are novolac resins, which may be added to improve the run length of the printing member by a post-development bake process.

Photothermal Conversion Materials

Imageable elements that are to be imaged with infrared radiation typically comprise an infrared absorber, known as a photothermal conversion material. Photothermal conversion materials absorb radiation and convert it to heat. The photothermal conversion material may be present in the underlayer and/or a separate absorber layer between the top layer and the underlayer. Although a photothermal conversion material is not necessary for imaging with a hot body, imageable elements that contain a photothermal conversion material may also be imaged with a hot body, such as a thermal head or an array of thermal heads.

The photothermal conversion material may be any material that can absorb radiation and convert it to heat. Suitable materials include dyes and pigments. Typical pigments include, for example, carbon black, Heliogen Green, Nigrosine Base, iron (III) oxide, manganese oxide, Prussian Blue, and Paris Blue. The size of the pigment particles should not be more than the thickness of the layer that contains the pigment. Preferably, the size of the particles will be half the thickness of the layer or less.

The photothermal conversion material may be a dye with the appropriate absorption spectrum and solubility. Dyes, especially dyes with a high extinction coefficient in the range of 750 nm to 1200 nm, are preferred. Examples of suitable dyes include dyes of the following classes: methine, polymethine, arylmethine, cyanine, hemicyanine, streptocyanine, squarylium, pyrylium, oxonol, naphthoquinone, anthraquinone, porphyrin, azo, croconium, triarylamine, thiazolium, indolium, oxazolium, indocyanine, indotricarbocyanine, oxatricarbocyanine, phthalocyanine, thiocyanine, thiatricarbocyanine, merocyanine, cryptocyanine, naphthalocyanine, polyaniline, polypyrrole, polythiophene, chalcogenopyrylo-arylidene and bis(chalcogenopyrylo) polymethine, oxyindolizine, pyrazoline azo, and oxazine classes. Absorbing dyes are disclosed in numerous publications, for example, Nagasaka, EP 0,823,327; DeBoer, U.S. Pat. No. 4,973,572; Jandrue, U.S. Pat. No. 5,244,771; Patel, U.S. Pat. No. 5,208,135; and Chapman, U.S. Pat. No. 5,401,618. Other examples of useful absorbing dyes include: ADS-830A and ADS-1064 (American Dye Source, Montreal, Canada), EC2117 (FEW, Wolfen, Germany), Cyasorb IR 99 and Cyasorb IR 165 (Glendale Protective Technology), Epolite IV-62B and Epolite III-178 (Epoline), SpectraIR 830A and SpectraIR 840A (Spectra Colors), as well as the IR dye whose structures is shown below, and IR Dye A and IR Dye B, whose structures are shown below.

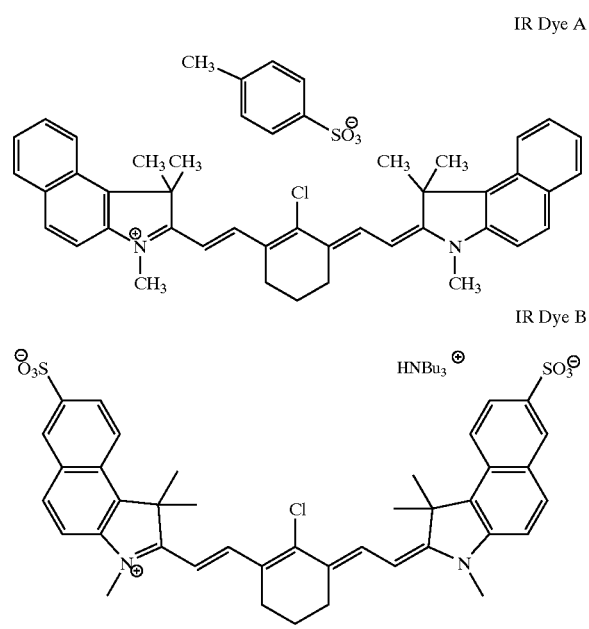

Water-soluble photothermal conversion materials include, for example, cyanine dyes that have one or more sulfate and/or sulfonate groups. Other infrared absorbing cyanine anions that contain two to four sulfonate groups are disclosed, for example, in West, U.S. Pat. No. 5,107,063; Pearce, U.S. Pat. No. 5,972,838; Chapman, U.S. Pat. No. 6,187,502; Fabricius, U.S. Pat. No. 5,330,884; and Japanese Laid Open Application No. 63-033477. The preparation of cyanine dyes with polysulfonate anions is disclosed, for example, in U.S. patent application Ser. No. 10/722,257, filed Nov. 25, 2003, the disclosure of which is incorporated herein by reference. The preparation of N-alkyl sulfate cyanine compounds is disclosed, for example, in U.S. patent application Ser. No. 10/736,364, filed Dec. 15, 2003, the disclosure of which is incorporated herein by reference.

The amount of photothermal conversion present in the element is generally sufficient to provide an optical density of at least 0.05, and preferably, an optical density of from about 0.5 to at least about 2 to 3 at the imaging wavelength. As is well known to those skilled in the art, the amount of compound required to produce a particular optical density at a particular wavelength can be determined using Beer's law. Although the amount present will depend on the compound or compounds chosen, when the photothermal conversion material is only present in the underlayer, it typically comprises about 0.2 wt % to about 8 wt %, more typically about 0.5 wt % to about 4 wt % of the underlayer.

Other Layers

The photothermal conversion material may be present in a separate absorber layer. When an absorber layer is present, it is between the top layer and the underlayer. The absorber layer preferably consists essentially of the photothermal conversion material and, optionally, a surfactant. It may be possible to use less of the photothermal conversion material if it is present in a separate absorber layer. The absorber layer preferably has a thickness sufficient to absorb at least 90%, preferably at least 99%, of the imaging radiation. Typically, the absorber layer has a coating weight of about 0.02 $g/m^2$ to about 2 $g/m^2$, preferably about 0.05 $g/m^2$ to about 1.5 $g/m^2$. Elements that comprise an absorber layer are disclosed in Shimazu, U.S. Pat. No. 6,593,055, the disclosure of which is incorporated herein by reference.

To minimize migration of the photothermal conversion material from the underlayer to the top layer during manufacture and storage of the imageable element, the element may comprise a barrier layer between the underlayer and the top layer. The barrier layer comprises a polymeric material that is soluble in the developer. If this polymeric material is different from the polymeric material in the underlayer, it is preferably soluble in at least one organic solvent in which the polymeric material in the underlayer is insoluble. A preferred polymeric material for the barrier layer is polyvinyl alcohol. When the polymeric material in the barrier layer is different from the polymeric material in the underlayer, the barrier layer should be less than about one-fifth as thick as the underlayer, preferably less than a tenth of the thickness of the underlayer. Imageable elements that comprise a barrier layer are disclosed in Patel, U.S. Pat. No. 6,723,490, the disclosure of which is incorporated herein by reference.

Substrate

The substrate comprises a support, which may be any material conventionally used to prepare imageable elements useful as lithographic printing plates. The support is preferably strong, stable, and flexible. It should resist dimensional change under conditions of use so that color records will register in a full-color image. Typically, it can be any self-supporting material, including, for example, polymeric films such as polyethylene terephthalate film, ceramics, metals, or stiff papers, or a lamination of any of these materials. Metal supports include aluminum, zinc, titanium, and alloys thereof.

Typically, polymeric films contain a sub-coating on one or both surfaces improve adhesion to subsequent layers. The nature of this layer or layers depends upon the substrate and the composition of subsequent layer or layers. Examples of subbing layer materials are adhesion-promoting materials, such as alkoxysilanes, aminopropyltriethoxysilane, glycidoxypropyltriethoxysilane and epoxy functional polymers, as well as conventional subbing materials used on polyester bases in photographic films.

When the substrate comprises a sheet of aluminum or an aluminum alloy, it should be of sufficient thickness to sustain the wear from printing and thin enough to wrap around a cylinder in a printing press, typically about 100 $\mu$m to about 600 $\mu$m. It is typically cleaned, roughened, and anodized by various methods known in the art. Initially, a degreasing treatment with a surfactant, an organic solvent, or an alkaline water solution is typically administered to the remove oil and grease from the surface of the sheet. Then the surface may be roughened by well known techniques, such as mechanical roughening, for example ball polishing, brush polishing, blast polishing and buff polishing, chemical roughening in which the surface is roughened by selectively dissolving the surface, or electrochemical roughening, or a combination of such chemical, mechanical, and/or electrochemical treatments (multi-graining). Etching of the substrate is performed using hot acidic (such as sulfuric or phosphoric) solutions or alkaline solutions (such as sodium hydroxide or trisodium phosphate mixed with sodium hydroxide). Anodic oxidation may be carried out to form a hydrophilic layer of aluminum oxide of the surface, typically a layer of aluminum oxide least 0.3 g/m$^2$ in weight. Anodic oxidation is performed by passing a current using the support as an anode in an electrolytic solution comprising an electrolyte, such as, for example, sulfuric acid, phosphoric acid, chromic acid, boric acid, citric acid, oxalic acid, or a mixture thereof. Anodic oxidation is disclosed, for example, in Fromson, U.S. Pat. No. 3,280,734, and Chu, U.S. Pat. No. 5,152,158.

Then, the cleaned, roughened, and anodized support may hydrophilized with an alkali metal silicate, such as aqueous potassium silicate, lithium silicate, or, typically, sodium silicate. Hydrophilization is described, for example, in Jewett, U.S. Pat. No. 2,714,066, and Fromson, U.S. Pat. No. 3,181,461. The support is either immersed in or electrolyzed in an aqueous solution of the alkali metal silicate.

Typically, the substrate comprises an interlayer between the aluminum support and the overlying layer or layers. The interlayer may be formed by treatment of the aluminum support with, for example, silicate, dextrine, hexafluorosilicic acid, phosphate/fluoride, polyvinyl phosphonic acid (PVPA), vinyl phosphonic acid co-polymers, or a water-soluble diazo resin. Co-polymers that comprise (1) phosphonic acid groups and/or phosphate groups, and (2) acid groups and/or groups that comprise alkylene glycol or polyalkylene glycol side chains, which are useful as interlayer materials, are also disclosed in U.S. patent application Ser. No. 10/922,782, filed Aug. 20, 2004, the disclosure of which are incorporated herein by reference. Co-polymers that comprise (1) acid groups and/or phosphonic acid groups, and (2) silyl groups substituted with three alkoxy and/or phenoxy groups, useful as interlayer material, are disclosed in U.S. patent application Ser. No. 10/928,339, filed Aug. 27, 2004, the disclosure of which are incorporated herein by reference.

The back side of the support (i.e., the side opposite the top layer and the underlayer) may be coated with an antistatic agent and/or a slipping layer or matte layer to improve handling and "feel" of the imageable element.

Preparation of the Imageable Element

The terms "solvent" and "coating solvent" include mixtures of solvents. These terms are used although some or all of the materials may be suspended or dispersed in the solvent rather than in solution. Selection of coating solvents depends on the nature of the components present in the various layers. The imageable element may be prepared by sequentially applying the underlayer over the hydrophilic surface of the substrate; applying the absorber layer or the barrier layer if present, over the underlayer; and then applying the top layer using conventional techniques.

The underlayer may be applied by any conventional method, such as coating or lamination. Typically the ingredients are dispersed or dissolved in a suitable coating solvent, and the resulting mixture coated by conventional methods, such as spin coating, bar coating, gravure coating, die coating, or roller coating. The underlayer may be applied, for example, from mixtures of methyl ethyl ketone, 1-methoxypropan-2-ol, γ-butyrolactone, and water; from mixtures of diethyl ketone, water, methyl lactate, and γ-butyrolactone; and from mixtures of diethyl ketone, water, and methyl lactate.

Preparation of imageable elements that comprise a barrier layer is disclosed in Patel, U.S. Pat. No. 6,723,490, the disclosure of which is incorporated herein by reference. Preparation of imageable elements that comprise an absorber layer is disclosed in Shimazu, U.S. Pat. No. 6,593,055, the disclosure of which is incorporated herein by reference. When neither a barrier layer nor an absorber layer is present, the top layer is coated on the underlayer. To prevent the underlayer from dissolving and mixing with the top layer, the top layer should be coated from a solvent in which the underlayer layer is essentially insoluble. Thus, the coating solvent for the top layer should be a solvent in which the components of the top layer are sufficiently soluble that the top layer can be formed and in which any underlying layers are essentially insoluble. Typically, the solvents used to coat the underlying layers are more polar than the solvent used to coat the top layer. The top layer may be applied, for example, from diethyl ketone, or from mixtures of diethyl ketone and 1-methoxy-2-propyl acetate. An intermediate drying step, i.e., drying the underlayer to remove coating solvent before coating the top layer over it, may also be used to prevent mixing of the layers.

Alternatively, the underlayer, the top layer, or both layers may be applied by conventional extrusion coating methods from a melt mixture of layer components. Typically, such a melt mixture contains no volatile organic solvents.

Imaging and Processing

The imageable elements may be thermally imaged with a laser or an array of lasers emitting modulated near infrared or infrared radiation in a wavelength region that is absorbed by the imageable element. Infrared radiation, especially infrared radiation in the range of about 800 nm to about 1200 nm, is typically used for imaging. Imaging is conveniently carried out with a laser emitting at about 830 nm, about 1056 nm, or about 1064 nm. Suitable commercially available imaging devices include image setters such as the CREO® Trendsetter (Creo, Burnaby, British Columbia, Canada), the Screen PlateRite model 4300, model 8600, and model 8800 (Screen, Rolling Meadows, Chicago, Ill., USA), and the Gerber Crescent 42T (Gerber).

Alternatively, the imageable element may be thermally imaged using a hot body, such as a conventional apparatus containing a thermal printing head. A suitable apparatus includes at least one thermal head but would usually include a thermal head array, such as a TDK Model No. LV5416 used in thermal fax machines and sublimation printers, the GS618-400 thermal plotter (Oyo Instruments, Houston, Tex., USA), or the Model VP-3500 thermal printer (Seikosha America, Mahwah, N.J., USA).

Imaging produces an imaged element, which comprises a latent image of imaged (exposed) regions and complementary unimaged (unexposed) regions. Development of the imaged element to form a printing plate, or printing form, converts the latent image to an image by removing the imaged regions, revealing the hydrophilic surface of the underlying substrate.

The developer may be any liquid or solution that can penetrate and remove the imaged regions of the top layer, the underlying regions of, if present, the absorber layer or barrier layer, and the underlying regions of the underlayer without substantially affecting the complimentary unimaged regions. Development is carried out for a long enough time to remove the imaged regions of the top layer, the underlying regions of, if present, the absorber layer or barrier layer, and the underlying regions of the underlayer in the developer, but not long enough to remove the unimaged regions of the top layer. Hence, the imaged regions are described as being "soluble" or "removable" in the developer because they are removed, and dissolved and/or dispersed, more rapidly in the developer than the unimaged regions. Typically, the underlayer is dissolved in the developer, the absorber layer is either dissolved or dispersed in the developer, and the top layer is dispersed in the developer.

Useful developers are aqueous solutions having a pH of about 7 or above and solvent based alkaline developers. Common components of developers are surfactants; chelating agents, such as salts of ethylenediamine tetraacetic acid; organic solvents such as benzyl alcohol and phenoxyethanol; and alkaline components such as inorganic metasilicates, organic metasilicates, hydroxides or bicarbonates. Typical aqueous alkaline developers are those that have a pH between about 8 and about 13.5, typically at least about 11, preferably at least about 12.

The developer may also comprise a surfactant or a mixture of surfactants. Preferred surfactants include: alkali metal salts of alkyl naphthalene sulfonates; alkali metal salts of the sulfate monoesters of aliphatic alcohols, typically having six to nine carbon atoms; and alkali metal sulfonates, typically having six to nine carbon atoms. A preferred alkali metal is sodium. The surfactant or mixture of surfactants typically comprises about 0.5 wt % to about 15 wt % based on the weight of the developer, preferably about 3 wt % to about 8 wt %, based on the weight of the developer. As is well known to those skilled in the art, many surfactants are supplied as aqueous surfactant solutions. These percentages are based on the amount of surfactant (i.e. the amount of active ingredient or ingredients exclusive of water and other inactive materials in the surfactant solution) in the developer.

A developer may also comprise a buffer system to keep the pH relatively constant, typically between about 5.0 and about 12.0, preferably between about 6.0 and about 11.0, more preferably between about 8.0 and about 10.0. Numerous buffer systems are known to those skilled in the art. Typically buffer systems include, for example: combinations of water-soluble amines, such as mono-ethanol amine, diethanol amine, tri-ethanol amine, or tri-1-propyl amine, with a sulfonic acid, such benzene sulfonic acid or 4-toluene sulfonic acid; mixtures of the tetra sodium salt of ethylene diamine tetraacetic acid (EDTA) and EDTA; mixtures of phosphate salts, such as mixtures of mono-alkali phosphate salts with tri-alkali phosphate salts; and mixtures of alkali borates and boric acid. Water typically comprises the balance of the developer. Useful commercially available aqueous alkaline developers include 3000 Developer and 9000 Developer (Kodak Polychrome Graphics, Norwalk, Conn., USA).

Solvent-based alkaline developers, which are typically used with negative working imageable elements, are excellent developers for use with the positive working, multi-layer, thermally imageable elements of this invention. Solvent-based developers comprise an organic solvent or a mixture of organic solvents. The developer is a single phase. Consequently, the organic solvent must be miscible with water, or at least soluble in the developer to the extent it is added to the developer, so that phase separation does not occur. The following solvents and mixtures of these solvents are suitable for use in the developer: the reaction products of phenol with ethylene oxide and propylene oxide, such as ethylene glycol phenyl ether (phenoxyethanol); benzyl alcohol; esters of ethylene glycol and of propylene glycol with acids having six or fewer carbon atoms, and ethers of ethylene glycol, diethylene glycol, and of propylene glycol with alkyl groups having six or fewer carbon atoms, such as 2-ethylethanol and 2-butoxyethanol. A single organic solvent or a mixture of organic solvents can be used. The organic solvent is typically present in the developer at a concentration of between about 0.5 wt % to about 15 wt %, based on the weight of the developer, preferably between about 3 wt % and about 5 wt %, based on the weight of the developer. Useful commercially available solvent-based developers include 956 Developer and 955 Developer (Kodak Polychrome Graphics, Norwalk, Conn., USA.).

The developer is typically applied to the precursor by spraying the element with sufficient force to remove the exposed regions. Alternatively, development may carried out in a processor equipped with an immersion-type developing bath, a section for rinsing with water, a gumming section, a drying section, and a conductivity-measuring unit, or the imaged precursor may be brushed with the developer. In each instance, a printing plate is produced. Development may conveniently be carried out in a commercially available spray-on processor, such as an 85 NS (Kodak Polychrome Graphics).

Following development, the printing plate is rinsed with water and dried. Drying may be conveniently carried out by infrared radiators or with hot air. After drying, the printing plate may be treated with a gumming solution. A gumming solution comprises one or more water-soluble polymers, for example cellulose, polyvinylalcohol, polymethacrylic acid, polymethacrylamide, polyvinylmethylether, polyhydroxyethylmethacrylate, gelatin, and polysaccharide such as dextran, pullulan, gum arabic, and alginic acid. A preferred material is gum arabic.

A developed and gummed plate may also be baked to increase the run length of the plate. Baking can be carried out, for example at about 220° C. to about 240° C. for about 7 minutes to 10 minutes, or at a temperature of 120° C. for 30 minutes.

INDUSTRIAL APPLICABILITY

The imageable elements of the invention have excellent resistance to press room chemicals. They can be thermally imaged and developed with an aqueous alkaline developer to form lithographic printing plates. Once the imageable element has been imaged and developed to form a lithographic printing plate, printing can then be carried out by applying a fountain solution and then lithographic ink to the image on its surface. The fountain solution is taken up by the surface of the hydrophilic substrate revealed by the imaging and development process, and the ink is taken up by the regions of the layers not removed by the development process. The ink is then transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

| Glossary | |
|---|---|
| 956 Developer | Solvent based (phenoxyethanol) alkaline negative developer (Kodak Polychrome Graphics, Norwalk, CT, USA) |
| AIBN | 2,2'-Azobisisobutyronitrile (DuPont, Wilmington, Delaware, USA) |
| BYK-307 | Polyethoxylated dimethylpolysiloxane co-polymer (BYK Chemie, Wallingford, CT, USA) |
| CREO ® Trendsetter 3244x | Commercially available platesetter, using Procom Plus software and having a laser diode array emitting at 830 nm (Creo Products, Burnaby, BC, Canada) |
| Ethyl violet | C.I. 42600; CAS 2390-59-2 (lambda$_{max}$ = 596 nm) [(p-($CH_3CH_2$)$_2$N$C_6H_4$)$_3$$C^+$ $Cl^-$] (Aldrich, Milwaukee, WI, USA) |
| IR Dye A | Infrared absorbing dye (lambda$_{max}$ = 830 nm) (Eastman Kodak, Rochester, NY, USA) (see structure above) |
| METMAC | [(2-Methacryloyloxy)ethyl]trimethyl-ammonium chloride, 75 wt % in water (Aldrich, Milwaukee, WI, USA) |
| N-13 | Novolac resin; 100% m-cresol; MW 13,000 (Eastman Kodak Rochester, NY, USA) |
| PEGMA | Polyethylene glycol methyl ether methacrylate, MW 2,080, 50% solution in water (Aldrich, Milwaukee, WI, USA) |
| Polymer 1 | Co-polymer of N-phenylmaleimide, methacrylamide, and methacrylic acid (45:35:20 mol %) |
| TMSPMA | 3-(Trimethoxysilyl)propyl methacrylate (Aldrich, Milwaukee, WI, USA) |
| Substrate A | 0.3 mm gauge, aluminum sheet which had been electrograined, anodized and treated with a solution of polyvinyl phosphonic acid |

Evaluation Procedure

Drop Test: Drops of either 1-butoxyethanol (Butyl CELLOSOLVE®) (80% in water) or diacetone alcohol (80% in water) were placed on the surface of the top layer. The time at which damage to the top layer occurred was observed.

Comparative Example 1

This example illustrates synthesis of a comparative co-polymer for the top layer. AIBN (0.4 g), 20 g of styrene, 20 g acrylonitrile, 80 g of 3-pentanone and 80 g of toluene were placed in a 250-ml 3-necked flask, equipped with magnetic stirring, temperature controller and nitrogen inlet. The mixture was heated to 60° C. and stirred under nitrogen for 6 h. AIBN (0.2 g) was added and heating and stirring continued for additional 8 h at 60° C. 197.5 g of polymer solution, containing 13.7 wt % of non-volatiles, was obtained. The polymer was not isolated. The polymer solution was used to prepare the coating solutions.

Comparative Example 2

An imageable element was prepared by the following procedure.

Underlayer: Polymer 1 (2.541 g) was dissolved a solvent mixture of 4.69 g of γ-butyrolactone, 7.03 g 1-methoxy-2-propanol, 30.49 g 2-butanone and 4.69 g of water. IR Dye A (0.45 g) was then added to this solution followed by 0.089 g of BYK-307 (10% solution in 1-methoxy-2-propanol). The resulting coating solution was coated onto Substrate A. Substrate A was mounted on a hot rotating drum and then contacted with the coating solution, which was delivered to the substrate by a pump. The coated substrate was dried by blowing hot air at 65° C. over the substrate for about 2 min. Coating weight of the underlayer: 1.5 g/$m^2$.

Top layer: Following the same procedure used to prepare the underlayer, a coating solution containing 98.5 g of the styrene/acrylonitrile co-polymer solution (13.5 g of co-polymer) from Comparative Example 1, 1.2 g of ethyl violet, 0.3 g of 10% BYK 307, 50 g of 3-pentanone, and 50 g of toluene was coated over the underlayer and the resulting imageable element dried. Coating weight of the top layer: 0.5 g/$m^2$.

In the drop test, for up to 5 min, no damage to the top layer was observed in the area of the top layer contacted with 1-butoxyethanol (80% in water).

The imageable element was thermally imaged on a CREO® Trendsetter 3244 with imaging energies from 80 mJ/$cm^2$ to 140 mJ/$cm^2$, and the resulting imaged imageable element developed with 956 developer. The imaged regions were removed to reveal the substrate. Film peeling was seen in the imaged regions, that is, the imaged regions showed fragments of the top layer after being passed through the developer.

Comparative Example 3

The procedure of Comparative Example 2 was repeated, except that the top layer contained 98.5 g of the co-polymer solution (13.5 g of co-polymer) from Comparative Example 1, 20 g of N-13 novolac resin, 1.2 g of ethyl violet, 0.3 g of 10% BYK 307, 50 g of 3-pentanone, and 50 g of toluene. Coating weight of the top layer: 0.5 g/$m^2$.

In the drop test, for up to 5 min, no damage to the top layer was observed in the area of the top layer contacted by 1-butoxyethanol (80% in water). Following thermal imaging and developing as in Comparative Example 2, the imaged regions were removed to reveal the substrate. Slight film peeling was seen in the imaged regions.

Example 1

AIBN (0.2 g), 9.5 g of styrene, 9.5 g acrylonitrile, 1.0 g of TMSPMA, 40 g of 3-pentanone and 40 g of toluene were placed in a 250-ml 3-necked flask equipped with magnetic stirring, temperature controller and nitrogen inlet. The mixture was heated to 60° C. and stirred under nitrogen for 6 h. AIBN (0.2 g) was added and heating and stirring continued for additional 8 hr at 60° C. The yield was 96 g with 16.3 wt % of non-volatiles. The polymer was not isolated. The polymer solution was used to prepare the coating solutions.

Example 2

AIBN (0.4 g), 17 g of styrene, 17 g acrylonitrile, 4 g of 2-hydroxyethyl methacrylate, 2 g of PEGMA (MW=1,000), 80 g of 3-pentanone and 80 g of toluene were placed in a 250-ml 3-necked flask equipped with magnetic stirring, temperature controller and nitrogen inlet. The mixture was heated to 60° C. and stirred under nitrogen for 6 h. AIBN (0.2 g) was added and the reaction was continued for additional 8 h at 60° C. The yield was 199 g with 16.4 wt % of non-volatiles. The polymer was not isolated. The polymer solution was used to prepare the coating solutions.

Example 3

The procedure of Comparative Example 2 was repeated, except that the top layer contained 98.5 g of the co-polymer solution (16.1 g of co-polymer) from Example 1, 1.2 g of ethyl violet, 0.3 g of 10% BYK 307, 50 g of 3-pentanone, and 50 g of toluene. Coating weight of the top layer: 0.5 g/m².

In the drop test, for up to 5 min, no damage to the top layer was observed in the area of the top layer contacted by 1-butoxyethanol (80% in water). Following thermal imaging and developing as in Comparative Example 2, the imaged regions were removed to reveal the substrate. Film peeling was seen in the imaged regions.

Example 4

The procedure of Comparative Example 2 was repeated, except that the top layer contained 98.5 g of the co-polymer solution (16.1 g of co-polymer) from Example 1, 20 g of N-13 novolac resin, 1.2 g of ethyl violet, 0.3 g of 10% BYK 307, 50 g of 3-pentanone, and 50 g of toluene. Coating weight of the top layer: 0.5 g/m².

In the drop test, for up to 5 min, no damage to the top layer was observed in the area of the top layer contacted by 1-butoxyethanol (80% in water). Following thermal imaging and developing as in Comparative Example 2, the imaged regions were removed to reveal the substrate. Slight film peeling was seen in the imaged regions.

Example 5

The procedure of Comparative Example 2 was repeated, except that the top layer contained 98.5 g of the co-polymer solution (16.2 g of co-polymer) from Example 2, 20 g of N-13 novolac resin, 1.2 g of ethyl violet, 0.3 g of 10% BYK 307, 50 g of 3-pentanone, and 50 g of toluene. Coating weight of the top layer: 0.5 g/m².

In the drop test, for up to 5 min, no damage to the top layer was observed in the area of the top layer contacted by 1-butoxyethanol (80% in water). Following thermal imaging and developing as in Comparative Example 2, the imaged regions were removed to reveal the substrate. No significant film peeling was seen in the imaged regions.

Example 6

AIBN (0.4 g), 17 g of styrene, 17 g of acrylonitrile, 4 g of METMAC, 2 g of PEGMA (MW=1,000), 80 g of 3-pentanone and 80 g of toluene were placed in a 250-ml 3-necked flask equipped with magnetic stirring, temperature controller and nitrogen inlet. The mixture was heated to 60° C. and stirred under nitrogen for 6 h. 0.2 g of AIBN was added and the reaction was continued for additional 8 h at 60° C. The yield was 196 g with 15.0 wt % of non-volatiles. The polymer was not isolated. The polymer solution was used to prepare the coating solutions.

Example 7

The procedure of Comparative Example 2 was repeated, except that the top layer contained 98.5 g of the co-polymer solution from Example 6, 0.3 g of ethyl violet, 0.3 g of 10% BYK 307, 50 g of 3-pentanone, and 50 g of toluene. Coating weight of the top layer: 0.5 g/m².

In the drop test, no damage to the top layer was observed in the area of the top layer contacted by diacetone alcohol (80% in water) for up to 5 min. No damage to the top layer was observed in the area of the top layer contacted by 1-butoxyethanol (80% in water) for up to 20 min. Following thermal imaging and developing as in Comparative Example 2, the imaged regions were removed to reveal the substrate. No significant film peeling was seen in the imaged regions.

Having described the invention, we now claim the following and their equivalents.

What is claimed is:

1. An imageable element comprising:
   a substrate;
   an underlayer over the substrate; and
   a top layer over the underlayer;
   in which:
   the element comprises a photothermal conversion material;
   the top layer is substantially free of the photothermal conversion material;
   the top layer is ink receptive;
   before thermal imaging, the top layer is not removable by an alkaline developer;
   after thermal imaging to form imaged regions in the top layer, the imaged regions are removable by the alkaline developer;
   the underlayer is removable by the alkaline developer, and
   the top layer comprises a co-polymer that comprises K units, L units, and M units; in which:
   the K units are selected from the group consisting of —[CH$_2$C(R$^1$)R$^2$]—, —[CH$_2$CR$^3$(CO$_2$R$^4$)]—, —[CH$_2$CR$^5$(CON(R$^6$)(R$^7$))]—, —[C(R$^8$)(COECO)C(R$^9$)]—, and mixtures thereof;
   the L units are selected from the group consisting of —[CH$_2$CH(CN)]—, —[CH$_2$C(CH$_3$)(CN)]—, and mixtures thereof;
   the M units are selected from the group consisting of —[CH$_2$C(R$^{10}$)(WSi(OR$^{11}$)$_3$)]—, —[CH$_2$C(R$^{12}$)(CO$_2$(B)$_{n1}$T)]—, —[(CH$_2$C(R$^{13}$)(CO$_2$(CH$_2$)$_{n2}$N$^+$(R$^{14}$)$_3$)X$^-$)]—, and mixtures thereof
   R$^1$, R$^3$, R$^5$, R$^8$, R$^9$, R$^{10}$, R$^{12}$, and R$^{13}$ are each independently hydrogen, methyl, or a mixture thereof;
   R$^2$ is hydrogen, methyl, phenyl, substituted phenyl, halogen, alkoxy of one to four carbon atoms, acyl of one to five carbon atoms, acyloxy of one to five carbon atoms, vinyl, allyl, or a mixture thereof;
   R$^4$, R$^6$, and R$^7$ are each independently hydrogen, alkyl of one to six carbon atoms, phenyl, or a mixture thereof;
   each R$^{11}$ is independently phenyl, alkyl of one to eight carbon atoms, or a mixture thereof;
   each R$^{14}$ is independently hydrogen, alkyl of one to six carbon atoms, or a mixture thereof;
   E is oxygen or NR$^{15}$ in which R$^{15}$ is hydrogen, hydroxyl, phenyl, substituted phenyl, alkyl of one to six carbon atoms, benzyl, or a mixture thereof;
   W is a bivalent linking group, a combination of bivalent linking groups, or a mixture of bivalent linking groups;
   B is selected from the group consisting of —[CH$_2$CH(R$^{16}$)O]—, —[CH$_2$C(R$^{17}$)(OH)]—, and mixtures thereof, in which each R$^{16}$ and R$^{17}$ is independently hydrogen, alkyl of one to six carbon atoms, or a mixture thereof;
   T is hydrogen, alkyl of one to eight carbon atoms, phenyl, or a mixture thereof;
   X$^-$ is an anion;
   $n_1$ is 1 to 100; and
   $n_2$ is 2 to 8.

2. The element of claim 1 in which the M units are —[CH$_2$C(R$^{10}$)(WSi(OR$^{11}$)$_3$)]—.

3. The element of claim 1 in which the M units are —[$CH_2C(R^{12})(CO_2B_nT)$]—.

4. The element of claim 1 in which the M units are —[($CH_2C(R^{13})(CO_2(CH_2)_{n2}N^+(R^{14})_3)X^-$)]—.

5. The element of claim 1 in which the top layer additionally comprises a phenolic resin selected from the group consisting of novolac resins, resole resins, and polyvinyl phenols.

6. The element of claim 1 in which:
the K units are selected from the group consisting of —[$CH_2C(R^1)R^2$]—, —[$CH_2CR^3(CO_2R^4)$]—, —[$CH_2CR^5(CON(R^6)(R^7))$]—, and mixtures thereof;
$R^2$ is phenyl;
$R^6$ and $R^7$ are each independently hydrogen, methyl, or a mixture thereof;
$R^4$ and $R^{11}$ are each methyl;
W is a carbon-silicon single bond, a phenylene group, an alkylene group containing 2 to 6 carbon atoms, a carboxy group, a combination thereof, or a mixture thereof;
B is —[$CH_2CH_2O$]—; and
$n_1$ is 10 to 50.

7. The element of claim 6 in which the co-polymer consists essentially of about 1 wt % to about 78 wt % the K units, about 20 wt % to about 98 wt % the L units, and about 1 wt % to about 30 wt % the M units.

8. The element of claim 7 in which the M units are —[$CH_2C(R^{10})(WSi(OR^{11})_3)$]—.

9. The element of claim 7 in which the M units are —[$CH_2C(R^{12})(CO_2B_nT)$]—.

10. The element of claim 7 in which the M units are —[($CH_2C(R^{13})(CO_2(CH_2)_{n2}N^+(R^{14})_3)X^-$)]—.

11. A method for forming an image, the method comprising the steps of:
a) thermally imaging an imageable element comprising: a substrate; an underlayer over the substrate; and a top layer over the underlayer; and forming an imaged imageable element comprising imaged and complementary unimaged regions in top layer;
in which:
the element comprises a photothermal conversion material;
the top layer is substantially free of the photothermal conversion material;
the top layer is ink receptive;
before thermal imaging, the top layer is not removable by an alkaline developer;
after thermal imaging to form imaged regions in the top layer, the imaged regions are removable by the alkaline developer;
the underlayer is removable by the alkaline developer, and
the top layer comprises a co-polymer that comprises K units, L units, and M units;
the K units are selected from the group consisting of —[$CH_2C(R^1)R^2$]—, —[$CH_2CR^3(CO_2R^4)$]—, —[$CH_2CR^5(CON(R^6)(R^7))$]—, —[$C(R^8)(COECO)C(R^9)$]—, and mixtures thereof;
the L units are selected from the group consisting of —[$CH_2CH(CN)$]—, —[$CH_2C(CH_3)(CN)$]—, and mixtures thereof;
the M units are selected from the group consisting of —[$CH_2C(R^{10})(WSi(OR^{11})_3)$]—, —[$CH_2C(R^{12})(CO_2(B)_{n1}T)$]—, —[($CH_2C(R^{13})(CO_2(CH_2)_{n2}N^+(R^{14})_3)X^-$)]—, and mixtures thereof
$R^1$, $R^3$, $R^5$, $R^8$, $R^9$, $R^{10}$, $R^{12}$, and $R^{13}$ are each independently hydrogen, methyl, or a mixture thereof;

$R^2$ is hydrogen, methyl, phenyl, substituted phenyl, halogen, alkoxy of one to four carbon atoms, acyl of one to five carbon atoms, acyloxy of one to five carbon atoms, vinyl, allyl, or a mixture thereof;
$R^4$, $R^6$, and $R^7$ are each independently hydrogen, alkyl of one to six carbon atoms, phenyl, or a mixture thereof;
each $R^{11}$ is independently phenyl, alkyl of one to eight carbon atoms, or a mixture thereof;
each $R^{14}$ is independently hydrogen, alkyl of one to six carbon atoms, or a mixture thereof;
E is oxygen or $NR^{15}$ in which $R^{15}$ is hydrogen, hydroxyl, phenyl, substituted phenyl, alkyl of one to six carbon atoms, benzyl, or a mixture thereof;
W is a bivalent linking group, a combination of bivalent linking groups, or a mixture of bivalent linking groups;
B is selected from the group consisting of —[$CH_2CH(R^{16})O$]—, —[$CH_2C(R^{17})(OH)$]—, and mixtures thereof, in which each $R^{16}$ and $R^{17}$ is independently hydrogen, alkyl of one to six carbon atoms, or a mixture thereof;
T is hydrogen, alkyl of one to eight carbon atoms, phenyl, or a mixture thereof;
$X^-$ is an anion;
$n_1$ is 1 to 100; and
$n_2$ is 2 to 8; and
b) developing the imaged imageable element with the alkaline developer and removing the imaged regions.

12. The method of claim 11 in which the M units are —[$CH_2C(R^{10})(WSi(OR^{11})_3)$]—.

13. The method of claim 11 in which the M units are —[$CH_2C(R^{12})(CO_2B_nT)$]—.

14. The method of claim 11 in which the M units are —[($CH_2C(R^{13})(CO_2(CH_2)_{n2}N^+(R^{14})_3)X^-$)]—.

15. The method of claim 11 in which the top layer additionally comprises a phenolic resin selected from the group consisting of novolac resins, resole resins, and polyvinyl phenols.

16. The method of claim 11 in which:
the K units are selected from the group consisting of —[$CH_2C(R^1)R^2$]—, —[$CH_2CR^3(CO_2R^4)$]—, —[$CH_2CR^5(CON(R^6)(R^7))$]—, and mixtures thereof;
$R^2$ is phenyl;
$R^6$ and $R^7$ are each independently hydrogen, methyl, or a mixture thereof;
$R^4$ and $R^{11}$ are each methyl;
W is a carbon-silicon single bond, a phenylene group, an alkylene group containing 2 to 6 carbon atoms, a carboxy group, a combination thereof, or a mixture thereof;
B is —[$CH_2CH_2O$]—; and
$n_1$ is 10 to 50.

17. The method of claim 16 in which the co-polymer consists essentially of about 1 wt % to about 78 wt % the K units, about 20 wt % to about 98 wt % the L units, and about 1 wt % to about 30 wt % the M units.

18. The method of claim 17 in which the M units are —[$CH_2C(R^{10})(WSi(OR^{11})_3)$]—.

19. The method of claim 17 in which the M units are —[$CH_2C(R^{12})(CO_2B_nT)$]—.

20. The method of claim 17 in which the M units are —[($CH_2C(R^{13})(CO_2(CH_2)_{n2}N^+(R^{14})_3)X^-$)]—.

* * * * *